(12) United States Patent
De Vries et al.

(10) Patent No.: US 7,419,530 B2
(45) Date of Patent: Sep. 2, 2008

(54) METHOD FOR FRACTIONAL CRYSTALLISATION OF A MOLTEN METAL

(75) Inventors: Paul Alexander De Vries, GM Heemstede (NL); Huibrecht Adriaan Wouters, MB Leiden (NL)

(73) Assignee: Aleris Switzerland GmbH c/o K+P Treuhangesellschaft, Schaffhausen (CH)

( * ) Notice: Subject to any disclaimer, the term of this patent is extended or adjusted under 35 U.S.C. 154(b) by 530 days.

(21) Appl. No.: 10/516,889

(22) PCT Filed: Jun. 27, 2003

(86) PCT No.: PCT/EP03/06901

§ 371 (c)(1),
(2), (4) Date: Dec. 3, 2004

(87) PCT Pub. No.: WO2004/005558

PCT Pub. Date: Jan. 15, 2004

(65) Prior Publication Data

US 2006/0162491 A1    Jul. 27, 2006

(30) Foreign Application Priority Data

Jul. 5, 2002  (EP) .................... 02077682

(51) Int. Cl.
C22B 9/02    (2006.01)
C22B 21/06   (2006.01)

(52) U.S. Cl. .......................... 75/414; 75/679

(58) Field of Classification Search ............... 75/10.11, 75/414, 679
See application file for complete search history.

(56) References Cited

U.S. PATENT DOCUMENTS

| | | | |
|---|---|---|---|
| 1,562,090 A | 11/1925 | Hoopes | |
| 1,938,101 A | 12/1933 | Hall | |
| 3,211,547 A | 10/1965 | Jarrette et al. | |
| 3,296,811 A | 1/1967 | Stoller | |
| 3,303,019 A | 2/1967 | Jacobs | |
| 3,308,666 A | 3/1967 | Anderson et al. | |
| 3,671,229 A | 6/1972 | Ferber et al. | |
| 3,839,019 A * | 10/1974 | Bruno et al. ............. 75/681 |
| 3,840,364 A | 10/1974 | Flemings et al. | |
| 4,043,802 A | 8/1977 | Esdaile et al. | |
| 4,050,683 A | 9/1977 | Langhammer | |
| 4,099,965 A * | 7/1978 | Beguin et al. ............. 75/678 |
| 4,133,517 A | 1/1979 | Esdaile et al. | |
| 4,222,830 A | 9/1980 | Dawless et al. | |
| 4,239,606 A | 12/1980 | Dawless et al. | |
| 4,273,627 A | 6/1981 | Dawless et al. | |
| 4,305,763 A | 12/1981 | Quist et al. | |
| 4,411,747 A | 10/1983 | Dawless et al. | |
| 4,456,480 A | 6/1984 | Wintenberger | |
| 4,581,062 A | 4/1986 | Boutin | |
| 4,736,314 A | 4/1988 | Riese et al. | |
| 4,744,823 A | 5/1988 | Raymond-Seraille | |
| 4,781,771 A * | 11/1988 | Masumoto et al. ........... 148/403 |
| 5,160,532 A * | 11/1992 | Benz et al. ................. 75/10.24 |
| 5,221,377 A | 6/1993 | Hunt, Jr. et al. | |
| 5,312,498 A | 5/1994 | Anderson | |
| 5,741,348 A | 4/1998 | Van Der Donk et al. | |
| 5,968,223 A | 10/1999 | Eckert | |
| 6,143,070 A * | 11/2000 | Bliss et al. ................... 117/49 |
| 6,224,648 B1 | 5/2001 | Verdoes et al. | |
| 6,290,900 B1 | 9/2001 | Hatano et al. | |
| 6,355,085 B1 | 3/2002 | Pillin et al. | |
| 2001/0031823 A1 | 10/2001 | Atchetee et al. | |
| 2004/0261572 A1 | 12/2004 | De Vries | |
| 2005/0039578 A1 | 2/2005 | De Vries | |
| 2005/0178239 A1 | 8/2005 | De Vries et al. | |
| 2007/0023110 A1 | 2/2007 | De Vries et al. | |
| 2007/0272057 A1 | 11/2007 | De Vries et al. | |

FOREIGN PATENT DOCUMENTS

| | | |
|---|---|---|
| DD | 258283 | 7/1988 |
| DE | 4325793 | 2/1995 |
| EP | 0099948 | 2/1984 |
| EP | 0375308 | 6/1990 |
| EP | 0587274 | 3/1994 |
| EP | 0745693 | 12/1996 |
| EP | 0829552 | 3/1998 |
| EP | 1288319 | 3/2003 |
| EP | 1380659 | 1/2004 |
| GB | 615590 | 1/1949 |

(Continued)

OTHER PUBLICATIONS

English translation of RU 2105084, translation date Aug. 2007.*

(Continued)

*Primary Examiner*—Roy King
*Assistant Examiner*—Tima M McGuthry-Banks
(74) *Attorney, Agent, or Firm*—Novak Druce + Quigg, LLP

(57) ABSTRACT

The invention relates to a method for fractional crystallization of an at most partially solidified molten metal. According to the invention a layer of at most partially solidified molten metal to be crystallized is cooled by a layer of cooling liquid, which is present above and/or below the layer of at most partially solidified molten metal so as to crystallize the molten metal.

15 Claims, 1 Drawing Sheet

FOREIGN PATENT DOCUMENTS

Figure 1:
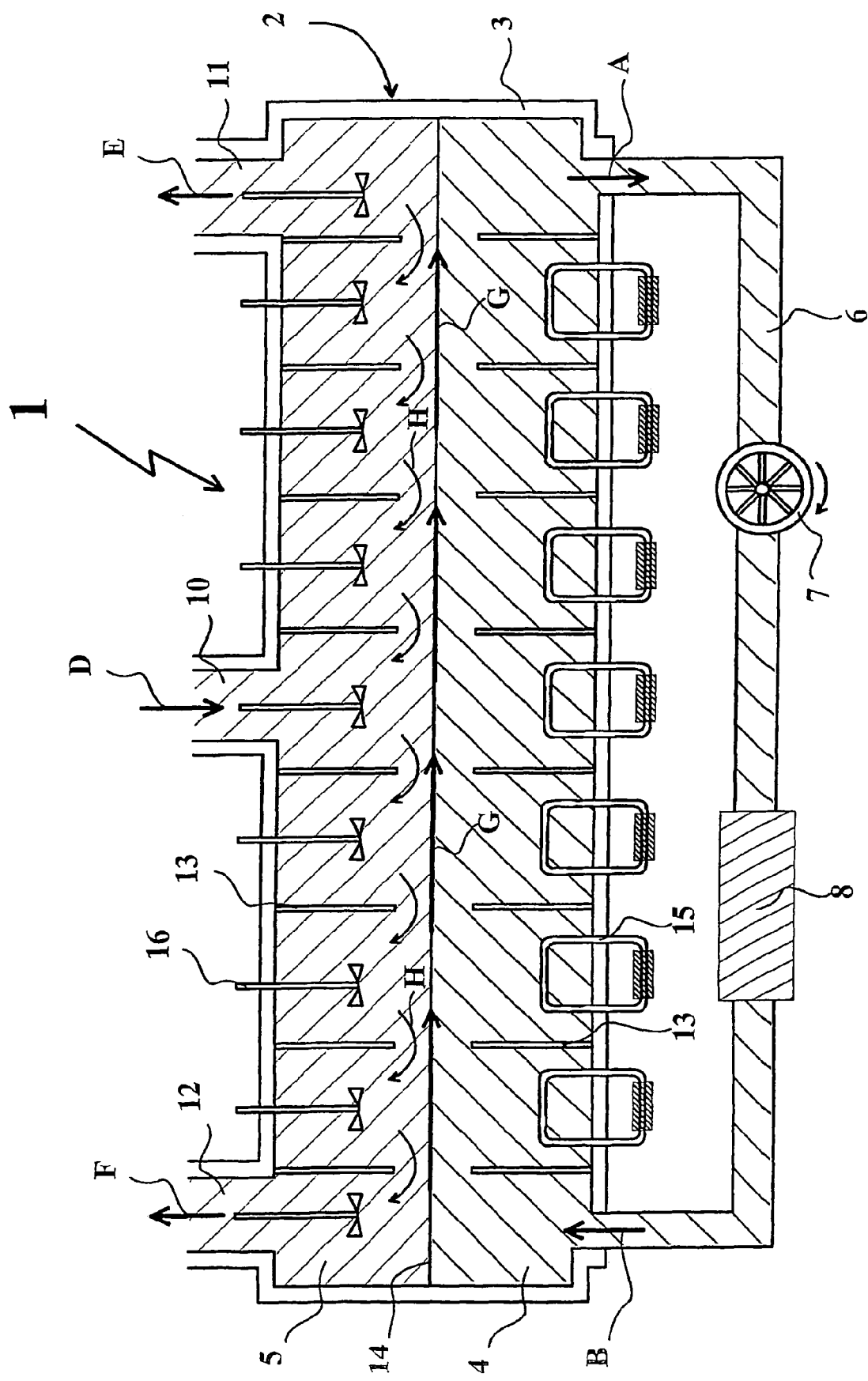

| | | |
|---|---|---|
| GB | 885503 | 12/1961 |
| GB | 974829 | 11/1964 |
| GB | 1352567 | 5/1974 |
| GB | 2154315 | 9/1985 |
| JP | 52135797 | 11/1977 |
| JP | 55050442 | 4/1980 |
| JP | 57152435 | 9/1982 |
| JP | 59205424 | 5/1983 |
| JP | 58104132 | 6/1983 |
| JP | 59028538 | 2/1984 |
| JP | 60234930 | 11/1985 |
| JP | 7070666 | 3/1995 |
| RU | 2105084 C1 * | 2/1996 |
| SU | 1589173 | 8/1990 |
| WO | 02052053 | 7/2002 |
| WO | 2005095658 | 10/2005 |

OTHER PUBLICATIONS

Patent Abstract of Japan vol. 007, No. 205 (C-185), Sep. 9, 1983.

Patent Abstract of Japan vol. 008, No. 114 (C-225), May 26, 1984.

Fourth International Symposium on Recycling of Metals and Engineering Materials TMS (The Minerals, Metals and Materials Society) 200. p. 979-991, Refining of a 5XXX Series Aluminium Alloy Scrap B ALCOA Fractional Recrystallization Process, by Ali Unal.

Perry's Chemical Engineers' Handbook, 7th ed., McGraw-Hill, 1997, p. 18-5 to 18-13.

Unpublished U.S. Appl. No. 10/598,731, DeVries, filed Sep. 8, 2006.

Notice of Allowance, Jan. 10, 2008, for U.S. Appl. No. 10/516,888, De Vries et al.

Office Action, Jul. 18, 2007, for U.S. Appl. No. 10/516,888, DeVries et al.

Notice of Allowance, Mar. 18, 2008, for U.S. Appl. No. 10/488,042, DeVries.

Office Action, Oct. 16, 2007, for U.S. Appl. No. 10/488,042, De Vries.

Office Action, May 11, 2007, for U.S. Appl. No. 10/488,042, De Vries.

Office Action, Jun. 26, 2007, for U.S. Appl. No. 10/491,278, De Vries.

Office Action, Dec. 3, 2007, for U.S. Appl. No. 10/491,278, DeVries.

Hanumanth et al., "Particle Sedimentation During Processing of Liquid Metal-Matrix Composites", Metallurgical Transaction B., vol. 23B, pp. 753-763 (1992).

L.C. Bartel et al., An Electrical Resistivity Measurement in Molten Basalt During the 1983 Kilauca Eruption, Bull. Volcanol., vol. 46.3, pp. 271-276 (1983).

Jo Isenberg-O'Loughlin, "Taming the Thunder," Metal Producing, vol. 33, pp. 21-23 (Sep. 1994).

Notice of Allowance mailed Jun. 2, 2008 for U.S. Appl. No. 10/488,042.

Notice of Allowance mailed Jun. 2, 2008 for U.S. Appl. No. 10/516,888.

* cited by examiner

METHOD FOR FRACTIONAL CRYSTALLISATION OF A MOLTEN METAL

This is the US National Stage of Patent Cooperation Treaty application No. PCT/EP2003/006901 having an international filing date of 27 Jun. 2003 and claiming priority from European patent application No. 02077682.9 filed 5 Jul. 2002.

The invention relates to a method for fractional crystallization of a molten metal.

Crystallization methods and apparatus are used to refine a metal (here used as an abbreviation for metal alloy) in which too high a concentration of a foreign element is present. This foreign element can be present because in the metal made from metal ore, the primary metal, too much of the foreign element is present, or because already used metal is recycled and the foreign element concentration in the scrap is too high. For instance aluminum scrap can contain too much of the foreign elements Fe, Si or Mg for use for commercial purposes without mixing it with primary metal containing little of the foreign element.

When use is made of fractional crystallization to refine the metal, crystals are formed in the molten metal during partial solidification of the molten metal, which crystals have a composition that is different from the composition of the molten metal that is used as a starting point.

A commercial method of fractional crystallization for refining a metal is used in the so-called Yunnan crystallizer. This crystallizer is used for refining a tin alloy by removing Pb from Sn. The molten tin alloy is fed into an elongated container having an open top and an inclined bottom, in which container a screw is slowly rotated. The surface of the molten tin alloy is cooled by spraying water, resulting in the crystallization of refined tin alloy. These crystals crystallize in the molten tin alloy and are transported to the shallow part of the container. Due to a temperature difference over the length of the container, in the shallow part the crystals are partially molten again, resulting in purer crystals. This mechanism repeats itself several times, and eventually very pure crystals are removed. Molten tin alloy containing Pb is removed at the deep end of the container. In this way, tin alloy containing approximately 10% Pb can be refined into tin alloy containing approximately 0.05% Pb.

This method for refining a metal by using the Yunnan crystallizer however cannot be used for all types of metal. One problem is that most metals have a melting point that is far higher than the melting point of the tin alloy for which the Yunnan crystallizer has been build. Because of the higher temperatures, the heat radiation is much higher (the heat radiation increases with the fourth power of the temperature in K) and the heat losses are much higher as well. As a result of this it is much more difficult to control the temperature in the crystallizer. Another problem is that for many metals the temperature difference between the crystallization temperature of the metal alloy and the crystallization temperature of the pure metal is very small, in the order of a few K. The Yunnan crystallizer cannot be used for such small differences in crystallization temperature. A secondary problem is that the use of a screw poses problems in some metals, because the metals normally used for the screw dissolve in these molten metals. A general problem is that the crystals formed in the molten metal tend to adhere to the walls of the crystallizer or the screw.

It is an object of the invention to provide an improved method particularly suitable for fractional crystallization and refinement of aluminum and suchlike metals having a high melting point.

It is another object of the invention to provide a method with which the temperature of the molten metal with the crystals can be controlled accurately.

It is still another object of the invention to provide a method with which the crystals will be in suspension in the molten metal, without attachment to a screw.

It is a further object of the invention to provide an improved method for the continuous fractional crystallization of metals.

One or more of these objects are reached with a method for fractional crystallization of an at most partially solidified molten metal, in which a layer of at most partially solidified molten metal to be crystallized is cooled by a layer of cooling liquid which is present above and/or below the layer of at most partially solidified molten metal so as to crystallize the molten metal.

The use of a cooling liquid to cool the molten metal so as to produce refined crystals are advantageous for a number of reasons. Firstly, the cooling liquid can tale up a lot of energy so the energy that has to be dissipated due to the crystallization can be easily removed. The temperature of the cooling liquid can be measured and controlled to control the temperature of the molten metal, whereas a mere cooling through the walls of a crystallization apparatus can not be used to accurately control the temperature of the molten metal. If the cooling should not only be effected through the walls of the apparatus, it normally has to be supplemented by way of a cooling device using a cooling coil or such an arrangement, which will cool the molten metal only at one exact place and on which the molten metal could crystallize, hampering the cooling effect of the cooling device.

Secondly, a cooling liquid will either be heavier or lighter than the molten metal, so the molten metal will float on the heavier cooling liquid or the lighter cooling liquid will float on he molten metal, or both if two types of cooling liquid are used. Crystals formed in molten metal will either sink through the molten metal or rise in the molten metal, and will end against a wall or against a cooling layer. This means that the crystals remain in suspension in the molten metal. It would be possible to separate the layer of cooling liquid and the layer of molten metal by a thin partition wall which does not hamper the cooling by the cooling liquid very much and to which the crystals do not adhere.

Preferably the layer of cooling liquid is only present below the layer of at most partially solidified molten metal. This is preferable because for most commercially interesting metals the crystals sink in the molten metal.

In a preferred embodiment the layer of cooling liquid contacts the layer of at most partially solidified molten metal. In this way no partition wall is present which would hamper the cooling effect of the cooling liquid and to which the crystals could adhere.

Preferably the layer of cooling liquid is cooled at at least one spot near the layer of at most partially solidified molten metal. To do so, the cooling liquid can be cooled using one or more cooling devices placed at desired spots in a crystallization apparatus used for implementing the method. Because the cooling liquid is cooled and not the molten metal, it is possible to accurately cool the molten metal such that crystals are formed in the molten metal near the place where the cooling device is present in the cooling liquid. The energy that has to be dissipated because of the crystallization of molten metal is thus removed at the desired spot.

According to a preferred embodiment of the method the cooling liquid is transported relative to the layer of at most partially solidified molten metal. The transportation of the cooling liquid relative to the layer of molten metal and, in practice, relative to a crystallization apparatus used for implementing the method, means that part of the cooling liquid is removed from the apparatus and new cooling liquid is introduced into the apparatus. Thus, dissipated energy is removed from the layer of cooling liquid that is present above an/or below the molten metal. In this way a very effective and very accurate way of cooling the molten metal is used, since the transportation velocity of the cooling liquid can be used to accurately remove energy from the molten metal. The transportation of the cooling liquid relative to the layer of molten metal also means that a temperature difference will exist over the length of the layer of cooling liquid, since the cooling liquid takes up energy from the molten metal during its transportation, so the cooling liquid will have a lower temperature where it is introduced and a higher temperature where it is removed. As a result also the layer of molten metal will possess a temperature gradient over its length, being slightly colder where the cooling liquid has a lower temperature and being slightly warmer where the cooling liquid has a higher temperature. The consequence is that crystals will be first formed in the coolest part of the layer of molten metal. These crystals will rise or sink to the layer of cooling liquid and once they are near or against the cooling layer they are transported together with the cooling layer. Due to the temperature gradient in the molten metal, the crystals are transported to a warmer part of the layer of molten metal. Here the crystals formed in the cooler part of the layer of molten metal recrystallise and thereby become more (or less) refined. This mechanism repeats itself through the length of the layer of molten metal. In this way very refined crystals are formed (or very refined molten metal is left) at the end of the layer of molten metal, depending on the length of the layer of molten metal. The crystals and/or molten metal can be removed near the place where the cooling liquid is removed.

Preferably, the cooling liquid is recycled and more preferably cooled. The cooling liquid is regenerated in this way, and by cooling it the temperature at which it is introduced into the layer of cooling liquid can be controlled. Together with the recycling velocity in this way the cooling capacity is given, if no separate cooling devices are used. Moreover, in the layer of cooling liquid a temperature gradient will exist between the spot where the cooled cooling liquid is introduced into the layer and the spot where the cooling liquid is removed from the layer.

According to a particularly preferred embodiment the molten metal is transported relative to the layer of cooling liquid. In this way it is possible to introduce fresh molten metal in a crystallization apparatus for implementing the method, by which a continuous fractional crystallization of the molten metal can be realized.

Of course it is preferred if both the cooling liquid and the molten metal are both transported relative to the crystallization apparatus, such that a continuous crystallization with an accurate cooling is possible.

Preferably the cooling liquid that is used is a molten salt. A molten salt will not easily react with the molten metal or with metal crystals, and has a high cooling capacity.

According to a preferred embodiment the layer of at most partially solidified molten metal is divided into compartments that communicate near the layer of cooling liquid. Each of the compartments in this way in principle forms its own crystallization apparatus, but the crystals that are formed in one compartment and are risen or sunk to the layer of cooling liquid are transported to the next compartment, if the cooling liquid is transported in a crystallization apparatus used for implementing the method. Due to the cooling of the cooling liquid crystals are formed in the molten metal. The selective transport of crystals results in a gradient in the metal purity over the length of the layer of molten metal, resulting in a temperature gradient in the layer of molten metal. The temperature in each compartment therefore slightly differs from the temperature in the next compartment, and crystals formed in one compartment can partially melt again in the next compartment to which they are transported by the cooling liquid, because in that compartment the temperature is higher. In this way a cascade of crystallization apparatus is formed, by which the crystals formed at the high temperature end of the layer of cooling liquid will have a high or low purity as compared to the molten metal.

Preferably, the at most partially solidified molten metal is stirred. By stirring the partially molten metal the crystals are kept in suspension and will not all rise or sink to the layer of cooling liquid.

In case the layer of at most partially solidified molten metal is divided into compartments, preferably the at most partially solidified molten metal is stirred in at least one compartment, more preferably in all compartments. As a result in each compartment in which the molten metal is stirred suspension crystallization takes place.

According to a preferred embodiment of the method at most partially solidified molten metal is added between both ends of the length of the layer of at most partially solidified molten metal, and refined metal is removed at one end and remaining molten metal is removed at the other end of the layer of metal. By introducing the at most partially solidified molten metal in which fractional crystallization still has to take place between both ends of the length of the layer of at most partially solidified molten metal, at one end the refined metal can be removed and the remaining molten metal can be removed at the other end.

Preferably, the metal used is aluminum. Aluminum is one of the metals for which the above method for fractional crystallization is particularly suited.

The fractional crystallization as described above is preferably used for removing Cu, Fe, Ga, Mg, Mn, B, Si, Sn, Zn or Ni from aluminum.

The invention will be elucidated referring to an exemplary embodiment, in view of the accompanying drawing.

FIG. 1 shows, in a schematic way, a cross section through a crystallization apparatus for implementing the method according to the invention.

FIG. 1 shows a crystallization apparatus 1 for the continuous fractional crystallization of a molten metal containing one or more foreign elements. The crystallization apparatus 1 has a chamber 2 with a wall 3, which wall is very well isolated as is known in the art, normally by special refractory materials.

In the chamber 2 of the apparatus is present a layer of cooling liquid 4, for instance molten salt, and a layer of partially molten metal 5, for instance aluminum with crystals. The cooling liquid can be drawn into (see arrow A) and transported through a recirculation pipe 6 by means of a pump 7. A cooling device 8 is present in the pipe 6 to cool the cooling liquid before it re-enters the chamber 2 (see arrow B).

The layer of partially molten metal 5 is present on the layer of cooling liquid 4, floating on the layer of cooling liquid 4. In the layer of molten metal 5 crystals are formed due to the cooling of the cooling liquid 4. Molten metal without crystals is supplied through an inlet 10 (arrow D). Molten metal with crystals is discharged through an outlet 11 (arrow E) at one end of the chamber 2, and molten metal containing a lot of the foreign element as a by-product is discharged through an outlet 12 (arrow F). The outlet 12 is present at the end of the chamber where the cooling liquid re-enters the chamber 2, and the outlet 11 at the other end of chamber 2. The inlet 10 can be present anywhere between the outlets 11 and 12, but is preferably present somewhere halfway the two ends of chamber 2.

In chamber 2 a number of compartments are formed by placing compartment walls 13 transverse in chamber 2. These compartment walls extend from the walls of chamber 2, both in the layer of cooling liquid and in the layer of partially molten metal, but end at a certain distance from the contact surface 14 between the layers. The number of compartments formed by the compartment walls can be varied depending on the type of metal, the contamination of the metal to be refined and the desired degree of refinement.

In each compartment formed in the layer of cooling liquid a cooling element 15 can be present for additional cooling of the cooling liquid. In each compartment in the partially molten metal a mixing element 16 can be present for stirring the molten metal with crystals, to keep the crystals in suspension and to enhance the exchange of material in the crystals and the molten metal.

The above described crystallization apparatus can for instance be used for the continuous fractional crystallization of aluminum containing 0.10% Si and 0.20% Fe (so-called P1020) to reach aluminum containing less than 0.01% Si and 0.01% Fe (so-called P0101).

For this crystallization process chamber 2 of the crystallization apparatus 1 has to have fifteen compartments in each layer, each compartment for the molten aluminum having a size of approximately 500×500×500 mm$^3$ and each compartment for the cooling liquid having a size of approximately 500×500×300 mm$^3$, so the chamber has an inner size of approximately 7.5 m (length)×0.5 m (width)×0.8 m (height).

The cooling liquid has to be heavier than the molten aluminum at approximately 660° C., which has a density of 2400 kg/m$^3$. The cooling liquid can be a salt of NaCl and KCl and/or NaF and KF containing $BaCl_2$ and $BaF_2$. With this composition a density of 3000 kg/m$^3$ and a melting point of 500° C. can be reached.

The method according to the invention implemented for aluminum with the above-described apparatus is as follows.

Molten aluminum with P1020 composition is introduced through inlet 10 at a temperature just above the crystallization temperature of approximately 660° C. At the contact surface 14 the layer of molten aluminum 5 contacts the layer of molten salt 4, and since the temperature of the molten salt is kept lower than the temperature of the molten aluminum, the temperature of the molten aluminum decreases and crystals are formed. These crystals contain less of the foreign elements Si and Fe and slowly sink through the molten aluminum onto the layer of molten salt.

The molten salt is transported through chamber 2 of the crystallization apparatus 1 during which it takes up energy from the molten aluminum, before it enters the recirculation pipe 6 due to the pumping of pump 7, and is cooled in the cooling device 8. The cooled molten salt re-enters the chamber 2 to cool the molten aluminum again. The molten salt is transported with a velocity of 1 to 3 m$^3$ per hour. On its way through the chamber 2, the molten salt takes with it the crystals that have sunk onto the layer of molten salt. The transportation of the molten salt through the chamber also results in the transportation of part of the molten aluminum, generally indicated by the arrows G. However, not all of the molten aluminum with crystals that is transported is discharged through outlet 11, so there is also a counter current generally indicated by the arrows H.

Due to the energy the molten salt takes up from the molten aluminum, the layer of molten salt 4 is gradually heated up from the left end to the right end of the chamber as seen in FIG. 1. As a result thereof, there is also a temperature difference in the molten aluminum, the molten aluminum having a lower temperature at the left end and a higher temperature at the right end of the chamber as seen in FIG. 1.

This temperature gradient in the molten aluminum is very useful for the continuous fractional crystallization according to the invention. A crystal that is formed in one compartment of the chamber is formed at a certain temperature of the molten aluminum; it will be more refined than the molten aluminum in which it is formed. When this crystal has sunk towards the molten salt and has been transported to the next compartment, it will be present in a compartment wherein the temperature of the aluminum is somewhat higher. The result will be that that crystal will partly or totally melt, which leads to a composition of the molten aluminum in that compartment that is more refined than the molten aluminum in the compartment to the left of it. In this compartment crystals will be formed again, which will also be more refined than the molten aluminum they are formed in. Crystals that are formed in a right-hand compartment will therefore be more refined than the crystals formed in an adjacent left-hand compartment.

This mechanism occurs in all compartments of the chamber, resulting in highly refined crystals at the right-hand end of the chamber and by-product with a high concentration of Si and Fe at the left-hand end of the chamber.

The mixing elements 16 are used to stir the molten aluminum in each compartment such that not all the crystals formed sink to the layer of molten salt, and a in each department a new equilibrium can be reached between the composition of the molten aluminum present in that compartment and the crystals formed therein. The size and rotational speed of the mixing elements depend on the size of the crystals to be formed and the velocity of the molten salt.

For the control of the crystallization, the apparatus is preferably equipped with means to measure and control the solid fraction, the chemical composition and/or the temperature in the layer of metal.

With the above-described apparatus, a production of about 20 tons per day of aluminum with P0101 composition can be reached; the by-product will be only some 10% thereof.

It will be understood that many changes can be made or will be necessary depending on the metal used and the foreign element that has to be removed from it. Moreover, it will not always be necessary to include all the components of the crystallization apparatus 1 as shown in FIG. 1. For instance, one or more or even all cooling elements 15 could be left out, and/or the or some of the compartment walls 13 in the molten salt could be left out, and/or one or more mixing elements 13 could be left out, and even the recirculation pipe 6 with pump 7 and cooling device 8 could be left out if there is no need to transport the molten metal and the apparatus is used for a batch process. It will be clear that these changes in the apparatus will influence the method for the fractional crystallization of a molten metal. Thus, the scope of the invention will only be determined by the accompanying claims.

The invention claimed is:

1. Method for fractional crystallisation of an at most partially solidified molten metal, wherein crystals are formed in the molten metal during partial solidification of the molten metal, which crystals have a composition different from the composition of the molten metal used as a starting point, comprising:

cooling a layer, of the at most partially solidified molten metal to be crystallised, by a layer of cooling liquid present above and/or below the layer of at most partially solidified molten metal to crystallise the molten metal to form the crystals having a composition different from the composition of the molten metal used as a starting point, wherein the layer of cooling liquid contacts the layer of at most partially solidified molten metal.

2. Method according to claim 1, wherein the layer of cooling liquid is only present below the layer of at most partially solidified molten metal.

3. Method according to claim 1, wherein the layer of cooling liquid is cooled in at least one spot near the layer of at most partially solidified molten metal.

4. Method according to claim 1, wherein the cooling liquid is transported relative to the layer of at most partially solidified molten metal.

5. Method according to claim 4, wherein the cooling liquid is recycled.

6. Method according to claim 1, wherein the molten metal is transported relative to the layer of cooling liquid.

7. Method according to claim 1, wherein the cooling liquid is a molten salt.

8. Method according to claim 1, wherein the layer of at most partially solidified molten metal is divided into compartments that communicate near the layer of cooling liquid.

9. Method according to claim 1, wherein the at most partially solidified molten metal is stirred.

10. Method according to claim 9, wherein the layer of at most partially solidified molten metal is divided into compartments that communicate near the layer of cooling liquid, and wherein the at most partially solidified molten metal is stirred in at least one compartment.

11. Method according to claim 1, wherein at most partially solidified molten metal is added between both ends of a length of the layer of at most partially solidified molten metal, and refined metal is removed at one end and remaining molten metal is removed at the other end of the layer of metal.

12. Method according to claim 1, wherein the metal used is aluminium.

13. Method according to claim 1, wherein the method removes Cu, Fe, Ga, Mg, Mn, B, Si, Sn, Zn or Ni from aluminium.

14. Method according to claim 4, wherein the cooling liquid is recycled and cooled.

15. Method according to claim 9, wherein the layer of at most partially solidified molten metal is divided into compartments that communicate near the layer of cooling liquid, and wherein the at most partially solidified molten metal is stirred in all compartments.

* * * * *